(12) United States Patent
Coffey

(10) Patent No.: US 10,023,158 B2
(45) Date of Patent: Jul. 17, 2018

(54) ANTI-THEFT VEHICLE BRAKE

(71) Applicant: Michael Coffey, Meridian, ID (US)

(72) Inventor: Michael Coffey, Meridian, ID (US)

( * ) Notice: Subject to any disclaimer, the term of this patent is extended or adjusted under 35 U.S.C. 154(b) by 0 days.

(21) Appl. No.: 15/351,000

(22) Filed: Nov. 14, 2016

(65) Prior Publication Data
US 2017/0137001 A1 May 18, 2017

Related U.S. Application Data

(60) Provisional application No. 62/254,400, filed on Nov. 12, 2015.

(51) Int. Cl.
B60R 25/00 (2013.01)
B60T 1/00 (2006.01)

(52) U.S. Cl.
CPC .................... B60T 1/005 (2013.01)

(58) Field of Classification Search
CPC ......... B60B 7/16; B60T 1/005; F16D 63/006; F16D 65/16; B60R 25/005; B60R 25/09; B60R 25/20; B60R 25/1001
USPC ..... 188/156–164, 265; 303/89; 70/226, 228, 70/233
See application file for complete search history.

(56) References Cited

U.S. PATENT DOCUMENTS

| 3,004,421 | A | | 10/1961 | Bowler | |
|---|---|---|---|---|---|
| 3,688,861 | A | * | 9/1972 | Lipschultz | B60R 25/02142 180/287 |
| 4,714,131 | A | * | 12/1987 | Wisegerber | B60R 25/1001 116/33 |
| 5,133,201 | A | * | 7/1992 | LaMott | B60R 25/09 188/265 |
| 5,602,426 | A | * | 2/1997 | Ecker | B60R 25/20 180/287 |
| 5,713,436 | A | * | 2/1998 | Gjovik | B60T 7/122 188/163 |
| 6,000,489 | A | * | 12/1999 | Rick | B60R 25/02153 180/287 |
| 6,367,888 | B1 | | 4/2002 | Kee et al. | |
| 6,615,624 | B2 | * | 9/2003 | Cardwell | B60R 25/005 180/287 |
| 6,665,613 | B2 | | 12/2003 | Duvall | |
| 6,789,856 | B2 | | 9/2004 | Bottiglieri | |
| 7,064,651 | B2 | * | 6/2006 | Goetz | B60R 25/24 307/10.3 |
| 7,379,805 | B2 | | 5/2008 | Olsen, III et al. | |
| 7,707,861 | B2 | * | 5/2010 | Xavier | B62H 5/141 188/265 |
| 8,602,506 | B2 | | 12/2013 | Sittnick | |
| 8,862,313 | B2 | | 10/2014 | Brey | |
| 2005/0023888 | A1 | | 2/2005 | Knight | |

* cited by examiner

Primary Examiner — Christopher P Schwartz
(74) Attorney, Agent, or Firm — Robert L. Shaver; Shaver & Swanson, LLP

(57) ABSTRACT

An anti-theft vehicle brake including a lockable restraining hub coupled to a wheel. The lock's default state being engaged and preventing rotation of the wheel. The lock including a solenoid bolt controlled through the communication of authenticating information sent from a transmitter and recognized by a receiver, triggering the disengagement of the bolt from the restraining hub allowing rotation of the wheel.

14 Claims, 4 Drawing Sheets ately disclosed and claimed technology generally

ANTI-THEFT VEHICLE BRAKE

PRIORITY/CROSS-REFERENCE TO RELATED APPLICATIONS

This application claims the benefit of U.S. Provisional Application No. 62/254,400, filed Nov. 12, 2015, the disclosure of which is incorporated by reference.

TECHNICAL FIELD

The presently disclosed and claimed technology generally relates to anti-theft devices, and more particularly to an anti-theft vehicle brake.

BACKGROUND

Though many devices exist to prevent the theft of wheeled vehicles, theft still occurs. Many thefts occur when a thief is able to bypass a traditional starting mechanism and start the engine (i.e. "hot wire" a vehicle). Still other theft occurs, particularly with respect to trailers and other non-motorized recreational vehicles, by simply towing the unattended trailer from it point of rest. Thus, a need exists for an anti-theft device that locks the wheels of vehicles and trailers, preventing them from rotating without authorization.

SUMMARY OF THE DISCLOSURE

The purpose of the Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the inventive concept(s) of the application, which is measured by the claims, nor is it intended to be limiting as to the scope of the inventive concept(s) in any way.

What is disclosed is an anti-theft vehicle brake designed to prevent a vehicle from being stolen. The anti-theft vehicle brake disclosed herein can be used on nearly any spindle/axle and wheel configuration. Thus, "vehicle" as used herein includes common motorized vehicles, such as passenger cars, trucks, vans, and motorcycles, as well as vehicles specialized for use in recreation or industry. "Vehicle" also includes non-motorized trailers for recreation or cargo transport. Those skilled in the art will recognize that additional applications of the disclosed device exist and are within the scope of this disclosure.

The anti-theft vehicle brake operates by mechanically locking one or more wheels, thereby preventing the wheels from rotating, and keeping the wheels locked unless and until triggered to unlock through the transmission of a digital key capable of being authenticated by the locking mechanism. The source of the digital key transmission may be an authorized vehicle, entity, or driver, and the transmission may be accomplished through wired or wireless methods.

The anti-theft vehicle brake includes an electronic spring bolt lock mounted to a spindle of a vehicle. The spindle may be attached to an axle, the frame of the vehicle itself, or some other point. This attached end of the spindle is known as the anchor end. The spindle also has a free end, which is directed away from the vehicle and upon which other parts, such as the brake assembly and wheel, are mounted. The spindle contains a first axis running from the free end to the anchor end and around which a mounted wheel rotates. If the spindle is attached to an axle, the electronic spring bolt lock may alternatively be mounted to the axle.

The electronic spring bolt lock is be mounted to the spindle (or axle) through some resilient method, such as welding, bolting, or clamping, though those skilled in the art will appreciate other methods may be used. The electronic spring bolt lock includes a power source, a receiver, a spring bolt actuating solenoid, a spring, and a spring bolt. Some or all of the components may be contained within a housing constructed of a durable substance, such as metal or heavyweight plastic. The size of the electronic spring bolt lock components may vary depending on the weight of the vehicle.

The electronic spring bolt lock may have its own integrated power source, such as a battery. Alternatively, or in addition to the integrated power source, the electronic spring bolt lock may be connected to the power source of the vehicle to which it is attached, such as a car battery. If attached to a trailer, the electronic spring bolt lock may also be configured to be powered by a tow vehicle after the tow vehicle has been connected to the trailer through the trailer's tow vehicle cord, or umbilical, through which the tow vehicle driver activates trailer components such as stop lights and electric brakes during towing.

The electronic spring bolt lock includes a solenoid, a spring bolt positioned within the solenoid, and a spring. The spring bolt is made of a magnetic substance, such as iron or steel, capable of being affected by the electromagnetic current created when the solenoid is actuated according to commonly known principles. While different shapes and dimensions of spring bolts may exist, the spring bolt is generally elongated so as to be able to freely travel within the solenoid.

The spring bolt has an engagement end and a spring end. The electronic spring bolt lock is mounted such that the engagement end of the spring bolt is directed toward the free end of the spindle. The spring end of the spring bolt is in contact with one end of the spring. The other end of the spring contacts a barrier such that the spring compresses as the spring bolt travels through the solenoid away from the free end of the spindle. When the electronic spring bolt lock is at rest (i.e. the solenoid is not activated), the spring is relaxed and expands away from the barrier, pushing the spring bolt toward the free end of the spindle. If the electronic spring bolt is contained within a housing, the housing will contain an aperture through which the engagement end of the spring bolt can travel. The spring bolt travels toward the free end of the spindle until the engagement end of the spring bolt engages with the restraining hub (discussed below), thereby preventing the restraining hub and wheel from rotating around the spindle, effectively locking the vehicle in place.

When the solenoid is activated, the electromagnetic current generated by the solenoid interacts with the spring bolt, causing the spring bolt to travel through the solenoid and compress the spring. In traveling through the solenoid, the spring bolt disengages from the restraining hub, allowing the restraining hub and wheel to be able to rotate around the spindle. If the electronic spring bolt is contained within a housing, the spring bolt's withdrawal through the aperture and into the housing may be partial or full.

The electronic spring bolt lock may be configured to limit the movement of the spring bolt when at rest and/or when the solenoid is activated. For example, adding one or more ribs around the spring bolt, or otherwise strategically varying the thickness of the spring bolt, and including some barrier along the spring bolt's line of travel, will prevent the spring bolt from travelling beyond a specified distance. Other physical barriers may be implemented to control the travel of the spring bolt or otherwise ensure it is retained within the electronic spring bolt lock.

As mentioned above, mounted onto the spindle is a restraining hub. In a typical embodiment, the restraining hub is generally disc shaped and is mounted normal to the axis of the spindle, with an exterior side facing the free end of the spindle, and an interior side facing the anchor end of the spindle. The restraining hub is mounted to the spindle through the use of common components (i.e. grease seals, bearings and races) such that it is able to rotate around the first axis.

The interior side of the restraining hub contains one or more seats configured to accept the engagement end of the spring bolt when the electronic spring bolt lock is at rest. In such a case, the seats may be simple recessions on the interior side of the restraining hub and the engagement end of the spring bolt would be configured to fit securely into one or more of the recessions. Alternatively, the engagement end of the spring bolt may contain a slot and the seats may be ribs or fins configured to fit within the slot, thereby allowing the spring bolt to engage with the seat. Numerous configurations exist in which the engagement end of the spring bolt and the seats contained within the restraining hub complement each other such that, when the spring bolt is engaged with the restraining hub, the restraining hub is mechanically prevented from rotating around the spindle.

The exterior side of the restraining hub contains stud bolts extending toward the free end of the spindle. The stud bolts are capable of supporting a brake component, such as a drum or rotor, and are used to mount a wheel and tire such that the restraining hub and wheel are coupled together. The anti-theft vehicle brake can be used independent of, in conjunction with, or even integrated into, existing disc and drum brake assembly technologies. If the vehicle has disc brakes, the restraining hub may be integrated into the rotor. lithe restraining hub is not integrated into the rotor, the rotor would contain holes to accommodate the stud bolts to allow the mounting of a wheel and tire. If the vehicle has drum brakes, the restraining hub may be integrated into the drum, or comprise a separate piece positioned in the center of the drum brake assembly, and the drum would contain holes to accommodate the stud bolts to allow the mounting of a wheel and tire.

When mounted to the stud bolts, the wheel is coupled to the restraining hub such that they must move together, if at all. When the electronic spring bolt lock is at rest (i.e. not activated), the spring relaxes, thereby extending the spring bolt through the solenoid and toward the free end of the spindle such that the spring bolt engages with a seat contained within the restraining hub. This engagement prevents the restraining hub, and therefore the wheel, from rotating around the spindle. Though the dimensions of the restraining hub and spring bolt components will vary depending on the weight of the vehicle, the restraining hub and electronic spring bolt lock must be mounted close enough together such that the spring bolt is capable of engaging the restraining hub when the electronic spring bolt lock is at rest.

When the solenoid is activated, the spring bolt is affected by the electromagnetic field and travels through the solenoid way from the free end of the spindle, compressing the spring. The engagement end of the spring bolt disengages from the restraining hub seat and the restraining hub and wheel are free to rotate around the spindle.

To activate the solenoid and disengage the spring bolt from the seat, the electronic spring bolt lock includes a receiver configured to receive a digital key communicated by a transmitter. The digital key is a unique code containing one or more alphanumeric characters, or some other form of information capable of being received and authenticated. Upon receiving the digital key, the solenoid is activated using the power source, either integrated with the electronic spring bolt lock or originating from the vehicle, and the spring bolt is disengaged from the restraining hub as described. Additional embodiments may incorporate a method of retaining the spring bolt in the disengaged position to create a "fail safe" mechanism preventing the spring bolt from inadvertently attempting to engage while the vehicle is underway.

The digital key may be transmitted wirelessly, such as through Bluetooth, WiFi, RFID, proximity (i.e. "smart key") or some other method of wireless communication known to those skilled in the art. The digital key may also be communicated through traditional wired connections. In one embodiment for use with trailers, the transmitter is contained within an authorized tow vehicle and the digital key is communicated to the receiver when the trailer's umbilical is connected to the tow vehicle. In this embodiment, once the trailer is connected to the tow vehicle, the transmitter onboard the tow vehicle communicates the digital key through the umbilical and the digital key is received by the receiver. The receiver then authenticates the digital key and the solenoid is activated, thereby disengaging the spring bolt from the seat.

The transmitter may also be portable. For example, the transmitter may be contained within a key fob capable of wirelessly communicating with the receiver within a specified distance, such as is common with modern key fobs. In this embodiment, the transmitter may communicate the digital key continuously through proximity sensor, or manually by a user pushing a button. The receiver receives the digital key, authenticates it, and activates the solenoid as described above. Other methods of embodying and communicating the digital key will be known to those skilled in the art.

While the typical embodiment assumes the use of a single digital key communicated from a particular transmitter to a particular receiver, it is within the scope of the invention that a receiver may be configured to accept multiple digital keys, such as when more than one tow vehicle, person, or entity is authorized to move a particular vehicle. Similarly, one or more transmitters may be configured to communicate the same digital key, such as is the common with having multiple keys to a single home or vehicle. Also, one or more receivers may be configured to accept the same digital key, such as when a single tow vehicle, person, or entity, desires to access multiple vehicles using a single transmitter. Other configurations exist whereby one or more transmitters communicate one or more digital keys to one or more receivers, depending on the situation.

It is also within the scope of the invention that the issuance, maintenance, and transmittal of digital keys may be managed by a third party. This third party may offer these services to users as a flat fee or on a periodic subscription basis.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

DETAILED DESCRIPTION OF THE EXEMPLARY EMBODIMENTS

Figure 1:
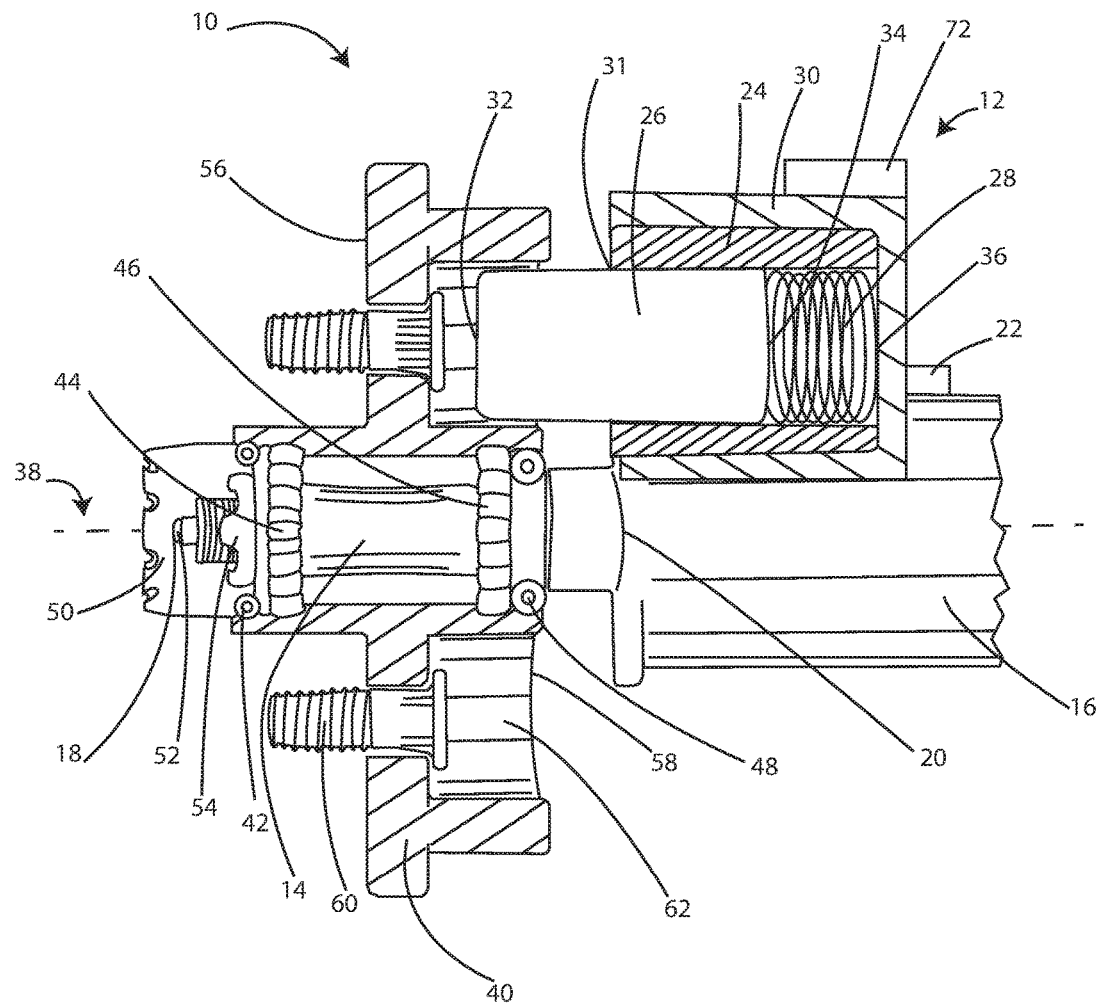
FIG. 1 depicts the anti-theft vehicle brake in an engaged position. Shown is a cross section of the restraining hub and an inner view of the electronic spring bolt lock.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

A preferred embodiment of the disclosed technology is shown FIGS. 1 through 4. FIG. 1 shows the anti-theft vehicle brake 10 in its default, or engaged status. The electronic spring bolt lock 12 may be attached to a spindle 14 or an axle 16. In FIG. 1, the electronic spring bolt lock is attached to an axle 16. The spindle 14 includes a free end 18, an anchor end 20. The spindle 14 is centered around a first axis 38 running from the free end 18 to the anchor end 20.

The electronic spring bolt lock includes a power source 22, a solenoid 24, a spring bolt 26 positioned within the solenoid 24, and a spring 28. In the embodiment shown in FIG. 1, the solenoid 24, spring bolt 26, and spring 28 are contained within a housing 30. The spring bolt 26 is metallic and includes an engagement end 32 and a spring end 34. The spring end 34 is in contact with the spring 28. The other end of the spring 28 is in contact with a barrier 36 such that, when the spring 28 is relaxed, it exerts a force against the spring end 34 of the spring bolt 26 sufficient to move the spring bolt 26 away from the barrier 36 and toward the free end 18 of the spindle 14 as depicted in FIG. 1. FIG. 1 also depicts an aperture 31 in the housing 30 through which the spring bolt 26 travels.

FIG. 1 also depicts a restraining hub 40 mounted on the spindle 14 according to common methods. The restraining hub 40 is typically mounted to the spindle 14 through the use of an outer grease seal 42, outer bearing and race 44, inner bearing and race 46, and inner grease seal 48. A dust cap 50, grease zurt 52, and spindle nut 54 are often affixed to the free end of the spindle 14. The restraining hub is mounted normal to the first axis 38 and contains an exterior side 56 and an interior side 58. Two or more stud bolts 60 extend from the exterior side 56 and can be used to support a brake assembly, if present. The stud bolts 60 are also used to mount the wheel and tire around the spindle 14.

On the interior side 58 of the restraining hub 40 are one or more seats 62 configured to accept the engagement end 32 of the spring bolt 26 when the solenoid 24 is not actuated and the spring 28 is relaxed. FIG. 1 depicts the spring 28 in a relaxed state and the spring bolt 26 extending toward the free end 18 of the spindle 14 and engaging with a seat 62.

The electronic spring bolt lock also includes a power source 22, which is depicted as being outside of the housing 30, though in other embodiments it may be contained within the housing 30. Various configurations of the power source may exist to those skilled in the art. For example, the power source 22 may be integrated into the electronic spring bolt lock 12 and include a battery, which may be rechargeable. The power source 22 may also be simply be a connection to an exterior electric supply, such as the vehicle battery, through which the electronic spring bolt lock is activated. If the electronic spring bolt lock 12 includes an integrated battery, the battery may be recharged using the exterior electric supply.

Figure 2:
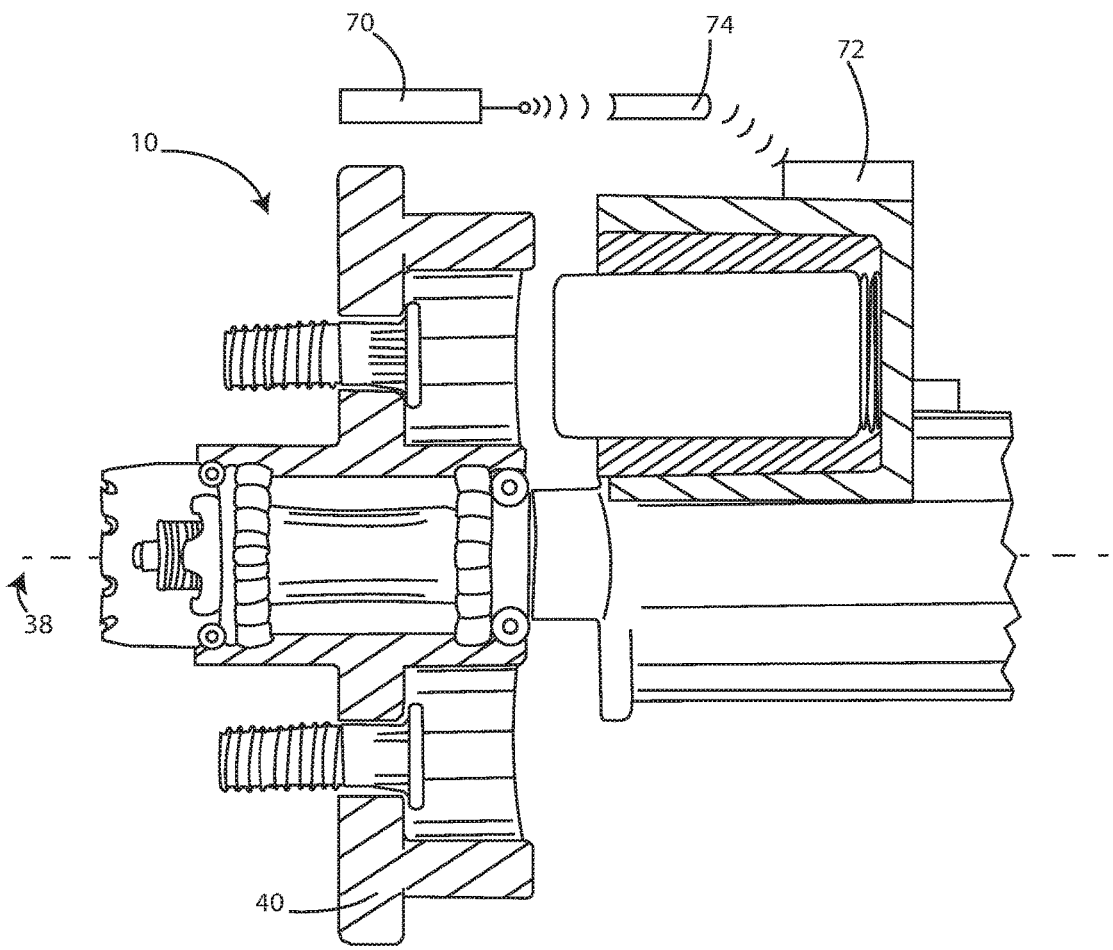
FIG. 2 depicts the anti-theft vehicle brake in a disengaged, or powered, positon. Shown is a cross section of the restraining hub and an inner view of the electronic spring bolt lock.

FIG. 2 depicts the anti-theft vehicle brake 10 in an active, or disengaged, state. In this state, power is running from, or through, the power source 22 to the solenoid 24, creating an electromagnetic current that interacts with the metallic spring bolt 26, causing the spring bolt 26 to withdraw into the solenoid 24 and away from the seat 62, thereby disengaging the restraining hub 40. The spring bolt 26 is held in this position while the solenoid 24 is actuated. As part of this process, the spring 28 is compressed between the spring end 34 of the spring bolt 26 and the barrier 36.

To ensure that the electronic spring bolt lock 12 is only disengaged by authorized entities, the anti-theft vehicle brake 10 includes an authentication mechanism including the use of a transmitter 70, receiver 72 and digital key 74. FIG. 2 depicts the transmitter 70 communicating the digital key 74, which is recognized and authenticated by the receiver 72, which triggers the actuation of the solenoid 24 and disengagement of the spring bolt 26 from the restraining hub 40. The communication of the digital key 74 between the transmitter 70 and the receiver 72 may be wired or wireless and, if wireless, can take a variety of embodiments, such as WiFi, RFID, Bluetooth or proximity. The transmitter may be portable, as with a key fob, or contained within an authorized vehicle, such as a tow vehicle.

Figure 3:
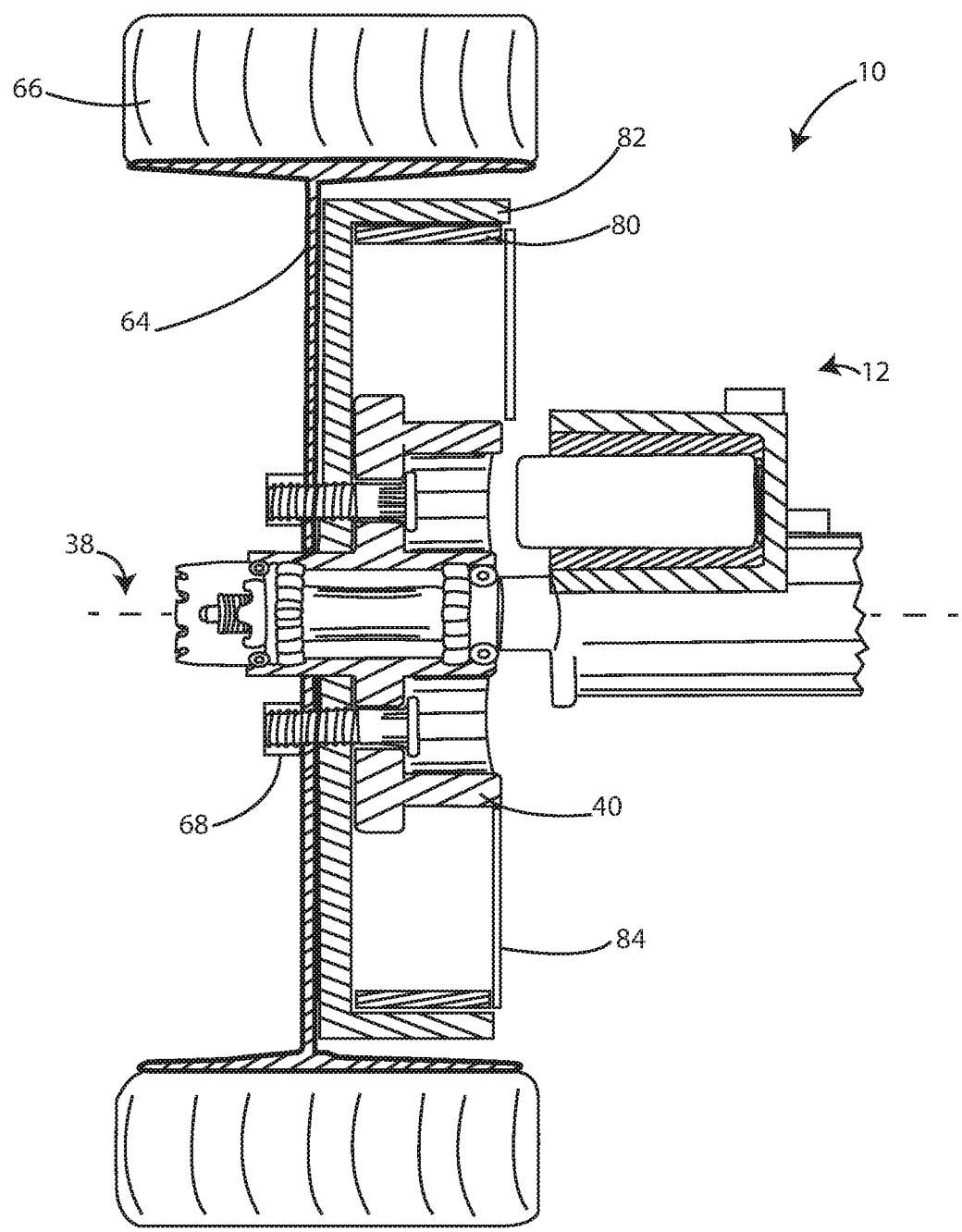
FIG. 3 depicts the anti-theft vehicle brake in conjunction with major components of a typical drum brake assembly.

FIG. 3 depicts the anti-theft vehicle brake 10 installed on a spindle in conjunction with a common drum brake assembly. The restraining hub 40 may be a separate piece around which the usual drum brake parts, such as brake pads 80, are placed with the restraining hub 40 centered against the backing plate 84 to which other brake components (cylinders, springs, etc.) are mounted (not shown). The brake drum 82 is then placed over the assembly such that the stud bolts 60 extend through the brake drum 82 and are accessible for the mounting of a wheel 64 and tire 66 using nuts 68. In an alternative embodiment, the restraining hub 40 may be integrated into the brake drum 82.

Figure 4:
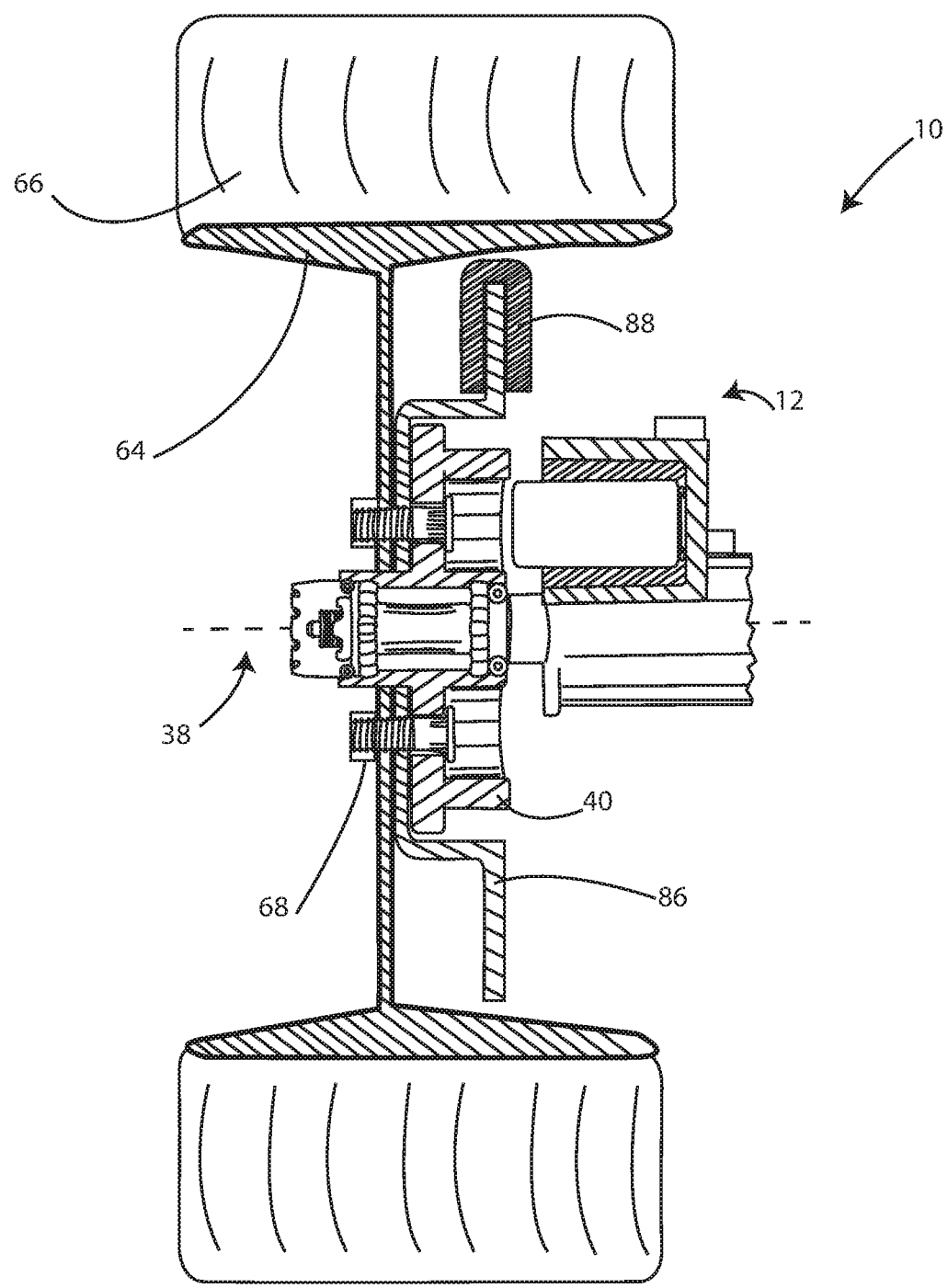
FIG. 4 depicts the anti-theft vehicle brake in conjunction with major components of a typical disc brake assembly.

FIG. 4 depicts the anti-theft vehicle brake 10 installed on a spindle 14 in conjunction with a common disc brake assembly. As with the drum brake assembly in FIG. 3, the restraining hub 40 may be a separate piece around which the usual disc brake parts, such as the rotor 86, with caliper 88, are placed. Stud bolts extend through the rotor 86 and are accessible for the mounting of a wheel 64 and tire 66 using nuts 68. In an alternative embodiment, the restraining hub may be integrated into the rotor.

As depicted in FIGS. 3 and 4, when the wheel 64 and tire 66 are mounted to the stud bolts 60 of the restraining hub 40 using nuts 68, the wheel 64 and restraining hub 40 move together, if at all. Thus, when the electronic spring bolt lock is in the default state as shown in FIG. 1, the spring bolt 26 is extended into a seat 62 of the restraining hub 40 and prevents both the restraining hub 40 and wheel 64 from rotating. When the electronic spring bolt lock 12 is active, the spring bolt 26 disengages from the seat 62 of the restraining hub 40 and the restraining hub 40 and wheel 64 are free to rotate.

While certain exemplary embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

What is claimed is:

1. An anti-theft vehicle brake for use on a vehicle, comprising:
    one or more spindles, each spindle having an anchor end where said spindle is attached to said vehicle, and a free end extending away from said vehicle, said spindle having a first axis running through said anchor end and said free end;
    an electronic spring bolt lock mounted to said spindle, said electronic spring bolt lock having a power source, a solenoid, a spring bolt positioned within said solenoid, and a spring;
    said spring bolt having an engagement end oriented toward said free end of said spindle, and a spring end in contact with said spring, said spring positioned between said spring end and a barrier, said electronic spring bolt lock configured such that, when said electronic spring bolt lock is at rest, said spring is relaxed and exerts a force against said spring end, which causes said spring bolt to travel through said solenoid toward said free end of said spindle, and when electronic spring bolt lock is active, said spring bolt withdraws into said solenoid and compresses said spring;
    a restraining hub mounted to said spindle such that said restraining hub is normal to said first axis, said restraining hub having an exterior side facing said free end and containing two or more stud bolts extending toward said free end and capable of accepting a wheel and tire, and an interior side facing said anchor end, said interior side containing one or more seats configured to accept said engagement end of said spring bolt, said restraining hub positioned on said spindle such that, when said spring is relaxed, said spring bolt is capable of engaging one or more of said seats thereby preventing rotation of said restraining hub;
    a receiver capable of receiving and authenticating a digital key, said digital key being necessary to activate said electronic spring bolt lock and disengage said spring bolt permitting said vehicle to be moved;
    a transmitter capable of communicating said digital key to said receiver; and
    said wheel and tire mountable to said spindle and coupled to said restraining hub using two or more nuts;
    wherein, when in a locked position, said electronic spring bolt lock is configured to extend said spring bolt through the force of said spring, thereby engaging said one or more seats contained within said restraining hub and preventing rotation of said wheel, and said electronic spring bolt lock further configured such that, upon receipt and authentication of said digital key by said receiver, said solenoid is actuated causing said spring bolt to withdraw from said seat into an unlocked position, thereby disengaging from said restraining hub and allowing rotation of said wheel.

2. The anti-theft vehicle brake of claim 1, wherein said power source originates from said vehicle.

3. The anti-theft vehicle brake of claim 1, wherein said receiver and said transmitter are capable of communicating via proximity connection.

4. The anti-theft vehicle brake of claim 1, wherein said transmitter is contained within a key fob.

5. The anti-theft vehicle brake of claim 1, wherein said electronic spring bolt lock is contained within a housing, said housing including an aperture through which said spring bolt may travel.

6. The anti-theft vehicle lock of claim 1, wherein said receiver and said transmitter are capable of communicating via Bluetooth connection.

7. The anti-theft vehicle lock of claim 1, wherein said receiver and said transmitter are capable of communicating via WiFi connection.

8. The anti-theft vehicle lock of claim 1, wherein said restraining hub is integrated into the drum of a drum brake assembly.

9. The anti-theft vehicle lock of claim 1, wherein said restraining hub is integrated into the rotor of a disc brake assembly.

10. The anti-theft vehicle lock of claim 1, wherein said anchor end of said spindle is attached to an axle and said electronic spring bolt lock is mounted to said axle.

11. The anti-theft vehicle lock of claim 1, wherein said power source originates from a tow vehicle.

12. The anti-theft vehicle lock of claim 1, wherein said vehicle is a trailer and said receiver and said transmitter communicate via a wired connection between said trailer and a tow vehicle configured to tow said trailer.

13. An anti-theft vehicle brake for use on a vehicle, comprising:
    one or more spindles, each spindle having an anchor end where said spindle is attached to said vehicle, and a free end extending away from said vehicle, said spindle having a first axis running through said anchor end and said free end;
    an electronic spring bolt lock mounted to said spindle, said electronic spring bolt lock having a power source, a solenoid, a spring bolt positioned within said solenoid, and a spring, said power source originating from said vehicle, and said spring bolt lock contained within a housing, said housing including an aperture through which said spring may travel;
    said spring bolt having an engagement end oriented toward said free end of said spindle, and a spring end in contact with said spring, said spring positioned between said spring end and a barrier, said electronic spring bolt lock configured such that, when said electronic spring bolt lock is at rest, said spring is relaxed and exerts a force against said spring end, which causes said spring bolt to travel through said solenoid toward said free end of said spindle, and when electronic spring bolt lock is active, said spring bolt withdraws into said solenoid and compresses said spring;
    a restraining hub mounted to said spindle such that said restraining hub is normal to said first axis, said restraining hub having an exterior side facing said free end and containing two or more stud bolts extending toward said free end and capable of accepting a wheel and tire, and an interior side facing said anchor end, said interior side containing one or more seats configured to accept said engagement end of said spring bolt, said restraining hub positioned on said spindle such that, when said spring is relaxed, said spring bolt is capable of engaging one or more of said seats thereby preventing rotation of said restraining hub;

a receiver capable of receiving and authenticating a digital key, said digital key being necessary to activate said electronic spring bolt lock and disengage said spring bolt permitting said vehicle to be moved;

a transmitter contained within a key fob and capable of communicating said digital key to said receiver using a proximity connection; and said wheel and tire mountable to said spindle and coupled to said restraining hub using two or more nuts;

wherein, when in a locked position, said electronic spring bolt lock is configured to extend said spring bolt through the force of said spring, thereby engaging said one or more seats contained within said restraining hub and preventing rotation of said wheel, and said electronic spring bolt lock further configured such that, upon receipt and authentication of said digital key by said receiver, said solenoid is actuated causing said spring bolt to withdraw from said seat into an unlocked position, thereby disengaging from said restraining hub and allowing rotation of said wheel.

14. An anti-theft vehicle brake for use on a vehicle, wherein said vehicle is a trailer, comprising:

one or more spindles, each spindle having an anchor end where said spindle is attached to an axle, and a free end extending away from said trailer, said spindle having a first axis running through said anchor end and said free end;

an electronic spring bolt lock mounted to said axle, said electronic spring bolt lock having a power source, a solenoid, a spring bolt positioned within said solenoid, and a spring, said power source configured to receive power from a tow vehicle configured to tow said trailer upon said tow vehicle being electronically connected to said trailer;

said spring bolt having an engagement end oriented toward said free end of said spindle, and a spring end in contact with said spring, said spring positioned between said spring end and a barrier, said electronic spring bolt lock configured such that, when said electronic spring bolt lock is at rest, said spring is relaxed and exerts a force against said spring end, which causes said spring bolt to travel through said solenoid toward said free end of said spindle, and when electronic spring bolt lock is active, said spring bolt withdraws into said solenoid and compresses said spring;

a restraining hub mounted to said spindle such that said restraining hub is normal to said first axis, said restraining hub having an exterior side facing said free end and containing two or more stud bolts extending toward said free end and capable of accepting a wheel and tire, and an interior side facing said anchor end, said interior side containing one or more seats configured to accept said engagement end of said spring bolt, said restraining hub positioned on said spindle such that, when said spring is relaxed, said spring bolt is capable of engaging one or more of said seats thereby preventing rotation of said restraining hub;

a receiver capable of receiving and authenticating a digital key, said digital key being necessary to activate said electronic spring bolt lock and disengage said spring bolt permitting said vehicle to be moved;

a transmitter capable of communicating said digital key to said receiver, said transmitter located within a tow vehicle configured to tow said trailer and further configured to transmit said digital key using a wired connection between said trailer and said tow vehicle, and said wheel and tire mountable to said spindle and coupled to said restraining hub using two or more nuts;

wherein, when in a locked position, said electronic spring bolt lock is configured to extend said spring bolt through the force of said spring, thereby engaging said one or more seats contained within said restraining hub and preventing rotation of said wheel, and said electronic spring bolt lock further configured such that, upon receipt and authentication of said digital key by said receiver, said solenoid is actuated causing said spring bolt to withdraw from said seat into an unlocked position, thereby disengaging from said restraining hub and allowing rotation of said wheel.

\* \* \* \* \*